Patented June 14, 1927.

1,632,312

UNITED STATES PATENT OFFICE.

FREDERICK C. RAETH, OF MILWAUKEE, WISCONSIN.

PROCESS OF CONVERTING CHEMICAL FERTILIZERS TO YEAST AND OTHER ORGANIC SUBSTANCES.

No Drawing.  Application filed January 25, 1924. Serial No. 688,606.

The object of my invention is to provide a novel process of producing organic nitrogenous substances, food very rich in protein and nuclein out of inorganic nitrogen in the form of chemical salts, thereby eliminating the time, labor and expense of cultivating and growing highly nitrogenous plants for food and fodder.

Another object is the conversion of the inorganic nitrogen of the chemical fertilizers into an organic form (protein and organic substances very rich in phosphorus and potassium) to be used as a substitute for the commercial chemical fertilizers.

The object of my invention is also to produce a food which contains a higher percentage of nitrogenous substances (protein) than any plant or grain, thereby eliminating the cultivation of certain plants and grains used for the feeding of animals (live stock) and birds (fowl).

A further object of my invention is to propagate various fungi, including certain types of yeasts, that can be used as edibles (food) by animals and man from a slightly sugared liquid containing a mixture of certain chemical salts which are commonly used as chemical fertilizers.

Other objects and advantages will appear in the following specification and the special features of the invention will be particularly pointed out in the appended claim.

My invention pertains to a growing, anabolic or building-up process of the organic protein substances of certain fungi, including certain types of yeasts and nitrifying bacteria, from a very diluted sugar solution containing certain inorganic nitrogen salts, for example, ammonium sulphate, without the production of any alcohol.

The sugar supplies the energy for the building-up process, so essential in the growth of the fungi, while the inorganically-combined nitrogen is converted to organically-combined nitrogen in the cells of fungi. To the inorganic nitrogen salts, such other chemical salts which are necessary to supply certain essential elements for the proper growth of the fungi, must be supplied.

The raw material required for the conversion of the inorganic nitrogen salts to an organic form are: sugar (specifically carbohydrate) ammonium sulphate; potassium phosphate (mono preferred); magnesium sulphate, a trace of iron and manganese salts, and an addition agent such as calcium carbonate or magnesium carbonate to regulate and neutralize the acidity of the free acids formed during the growth of the organic substances. The iron and manganese aid and possibly acting as catalyzers or as an essential part of the food, in the absorption of the atmospheric oxygen which is so essential in producing a rapid growth of the fungi and ferments. A solution of these substances becoming a perfect food for the growth and synthetic production of the organic cell substances of the fungi.

The chemical food becomes suitable for the feeding of the various fungi on the application of a suitable degree of heat and intense aeration. The purpose of the aeration is to supply oxygen to the growing cells and to prevent the formation and accumulation of alcohol.

The sugar solution may be prepared from a properly prepared and diluted molasses, syrup, dextrose, cane sugar, or any other form of fermentable sugar, such as may be obtained by the saccarification of starch or the hydrolysis of cellulose. The percentage of sugar may vary anywhere from ½ per cent to 10 per cent, but for the sake of economy a solution containing 1 to 2 per cent of sugar is used.

Various chemical salts may be used in making up the nutritive solution. The chemical salts used to supply the nitrogen are similar to those used in the commercial chemical fertilizers and may be either ammonium compounds, nitrates, or calcium cyanamid. These may be used either alone or with admixtures of one or more of the following chemical fertilizer salts: Phosphates of sodium, potassium or ammonium; super phosphate of lime; the sulphate, the bitartrate, or chloride of potassium; magnesium sulphate or carbonate; and chalk, powdered or granular.

For purposes of illustration, we will assume that the material to be used, for the conversion of the inorganic nitrogen in the chemical salts to the living (vital) organic nitrogenous substances of the fungi and ferments, such as protein and nuclein, is made up according to the following formula:

General formula.

| | Grams. |
|---|---|
| Dextrose | 2.0 |
| Ammonium sulphate, $(NH_4)_2SO_4$ | 0.5 |
| Ammonium phosphate, $(NH_4)_3PO_4$ | 0.5 |
| Potassium acid phosphate, $KH_2PO_4$ | 0.5 |
| Magnesium sulphate, $MgSO_4$ | 0.05 |
| Table salt, NaCl | 0.05 |
| Chalk, $CaCO_3$ (granular) | 0.1+ |
| Ferrous sulphate, $FeSO_4$ | 0.01 |
| Manganese sulphate, $MnSO_4$ | 0.005 |
| Water, approximately | 100 |

When molasses is used to supply the necessary sugar content, it is advisable to first boil it when diluted (1 part molasses to 2 parts water) with a small percentage of sulphuric acid to invert the sucrose to an equal molecular mixture of dextrose (glucose) and fructrose, a more readily assimable sugar. The sulphuric acid is then neutralized and the molasses solution diluted again to make a solution containing about 2 per cent sugar.

The chemical salts are then added and the solution stirred until the salts are all dissolved.

This nutritive solution is now run into a large propagation tank or tub and a small quantity of a pure culture of a certain type of fungus, or a certain ferment added; as, for example, one of the following species: *Saccharomyces cerevisiæ; B. macerans; mycoderma*, or a torula type of ferment.

The temperature of the nutritive solution should be maintained between 25° to 30° C. during the entire process.

During the cultivation and propagation of these aerobic fungi, pure air is passed into the solution, thus supplying the needed oxygen for the life and growth of the fungi.

The complete conversion of the chemical salts by the fungi and ferments requires from 10 to 20 hours.

The scum or froth may rise to the surface or settle to the bottom of the tub when the aeration is stopped. This scum is the cultivated organic matter and may be entirely separated from the liquid by skimming, decantation, or by a centrifuge.

The process just outlined may be either a batch or a continuous process and depending for its continuity upon fungus growth, the continuous addition of the nutritive salts and on the controlled removal or neutralization of certain by-products, as, for instance, sulphuric acid.

It has been found by numerous experiments that the composition of the nutritive solution may be varied greatly and that certain chemical salts may be used whose mixture may result in furnishing the essential elements, namely, nitrogen, potassium, phosphorus, and magnesium.

The following formula is a good example of how the chemical salts may be varied to obtain the same results obtained by the nutritive mixture mentioned in the "general formula":

Modified general formula.

| | Grams. |
|---|---|
| Dextrose | 2 |
| Potassium chloride, KCl | 0.4 |
| Sodium acid phosphate, $NaH_2PO_4$ | 0.8 |
| Ammonium phosphate, $(NH_3)_3PO_4$ | 0.2 |
| Ammonium sulphate, $(NH_3)_2SO_4$ | 0.8 |
| Magnesium sulphate, $MgSO_4$ | 0.05 |
| Calcium carbonate (chalk) | 0.1 |
| Ferrous sulphate, $FeSO_4$ | 0.01 |
| Manganese sulphate, $MnSO_4$ | 0.005 |
| Water approximately | 100 |

The foregoing description of the process of converting inorganic fertilizer compounds into organic fertilizers and foods will enable one readily to see the advantages to be derived.

So far, it has been considered impossible to grow certain fungi and ferments when the inorganic nitrogen, obtained from chemicals, is the sole source of nitrogen supply for the propagation of the cells; that organic nitrogen in the form of peptones, asparagin, etc., has always been considered essential.

Chemical analysis of a great number of samples of the compressed fungi and ferments which may either be used as food or as an organic fertilizer, gave the following average composition:

| | Per cent. |
|---|---|
| Protein | 55.00 |
| Carbohydrates, or nitrogen-free extracts | 25.00 |
| Water | 8.00 |
| Ash (chiefly magnesium and potassium phosphates) | 7.00 |
| Fat | 3.50 |
| Fibre | 1.50 |

It will thus be seen that I have provided a new process by which useful organic substances are cultivated and a number of advantages are attained.

What I claim is:

The process of converting inorganically combined nitrogen to organically combined nitrogen for use as fertilizers and foods, consisting in inoculating with yeast an aqueous solution of the following composition: to 2 grams yeast fermentable sugar and ½ gram ammonium sulphate, ½ gram ammonium phosphate, ½ gram monopotassium dihydrogen phosphate, 1/20 gram magnesium sulphate, 1/20 gram sodium chloride, approximately 1/10 gram calcium carbonate, 1/100 gram ferrous sulphate, 1/200 gram manganese sulphate, water approximately 100 grams, and aerating for a period of from 10 to 20 hours.

FREDERICK C. RAETH.